(12) United States Patent
Hayer et al.

(10) Patent No.: US 7,783,714 B2
(45) Date of Patent: Aug. 24, 2010

(54) MESSAGE TRANSPORT MANAGER AND METHODS FOR USING THE SAME

(75) Inventors: Roman Hayer, Saarbruecken (DE); Bernhard Brinkmoeller, Wiesloch (DE); Franz Weber, Wiesloch (DE); Volker Wiechers, Heidelberg (DE); Thea Hillenbrand, Rauenberg-Rotenberg (DE)

(73) Assignee: SAP AG, Walldorf (DE)

( * ) Notice: Subject to any disclaimer, the term of this patent is extended or adjusted under 35 U.S.C. 154(b) by 230 days.

(21) Appl. No.: 12/003,102

(22) Filed: Dec. 20, 2007

(65) Prior Publication Data

US 2009/0164548 A1 Jun. 25, 2009

(51) Int. Cl.
*G06F 15/16* (2006.01)
(52) U.S. Cl. .................. 709/206; 709/204; 709/207; 705/39
(58) Field of Classification Search .......... 709/204–207
See application file for complete search history.

(56) References Cited

U.S. PATENT DOCUMENTS

2007/0156428 A1* 7/2007 Brecht-Tillinger et al. ..... 705/1
2007/0244811 A1* 10/2007 Tumminaro ................... 705/39
2009/0144371 A1* 6/2009 Hind et al. ................... 709/206
2009/0222360 A1* 9/2009 Schmitt et al. ................ 705/29

OTHER PUBLICATIONS

Combining Web Services to Manage Real-Time Navigation Data Distribution Ferguson, M.O.; Oceans 2006—Asia Pacific May 16-19, 2007 pp. 1-5.*

* cited by examiner

*Primary Examiner*—Wing F Chan
*Assistant Examiner*—Razu A Miah
(74) *Attorney, Agent, or Firm*—Finnegan, Henderson, Farabow, Garrett & Dunner, LLP

(57) ABSTRACT

Methods and systems consistent with the invention manage messages transported between a first computer system and a second computer system. For instance, in one embodiment, According to another exemplary embodiment, a method obtains a business object identifier that identifies a business object associated with a first message to be transported over a network from the first computer system to the second computer system. The method may then generate a transport identifier associated with the transported message. The method may then route the first message the second computer system, such that the routing generates a second message that is transported to the second computer system. The method then obtains the second message transported to the second computer system. Finally, the method creates a data structure in memory including the transport identifier, the business object identifier, and the second message.

14 Claims, 5 Drawing Sheets

MESSAGE TRANSPORT MANAGER AND METHODS FOR USING THE SAME

TECHNICAL FIELD

Systems and methods consistent with the invention relate generally to managing messages and, more particularly, to managing the transport of messages associated with one or more business objects.

BACKGROUND

Collaborative computing environments, such as business-to-business (B2B) computing environments, typically use a messaging system to communicate messages between computing systems within the environment. When the collaborative computing environment is a Service Oriented Architecture (SOA) or other type of distributed objects architecture, a business object may cause or initiate the generation of a particular message. An example of an SOA can be found in the Enterprise Service Infrastructure (ESI), which is commercially available from SAP AG, Walldorf, Germany.

The messaging system may be implemented by an exchange infrastructure, which is also commercially available from by SAP AG, Walldorf, Germany. The communicated messages can take virtually any form, such as the extensible markup language (XML) format, and can include a variety of content. The messaging system typically uses some form of routing scheme to route the messages from a sender to one or more intended recipients. As part of the routing scheme, the messaging system may process the message in various ways. For example, the routing scheme may change the message's content. The routing scheme may also need to split the routed message into different messages (e.g., "child" messages of the "parent" message).

As a result of this route processing, the generated message becomes decoupled from the business object. In other words, systems can not identify which business object was originally associated with a sent message. Conventional messaging systems and the computing environments in which they are used, have thus been unable to correlate business objects and corresponding messages during B2B messaging communications. This is due, in part, to the complexity of the messaging system and the routing schemes used by these systems. This is also due to the fact that the messaging system is a generic messaging system that does not have the capability to correlate business objects to messages.

It is thus desirable, when sending one or more messages to another computer system via a messaging system, to obtain and retain information about the sent messages and to correlate the messages with the business object(s) with which the messages are associated.

SUMMARY

The present invention provides methods and apparatus, including computer program products, for managing the transport of messages in a software environment.

In one exemplary embodiment, there is provided a method for managing messages transported between a first computer system and a second computer system, the method comprising: obtaining a business object identifier that identifies a business object, from the first computer system, that is associated with a message transported between the first computer system and the second computer system; obtaining a copy of the message received/transmitted by the second computer system; and creating a data structure that includes the business object identifier and the message received/transmitted by the second computer system.

According to another exemplary embodiment, there is provided a method for managing messages transported between a first computer system and a second computer system, the method comprising: obtaining a business object identifier that identifies a business object associated with a first message to be transported over a network from the first computer system to the second computer system; generating a transport identifier associated with the transported message; routing the first message the second computer system, wherein the routing generates a second message that is transported to the second computer system; obtaining the second message transported to the second computer system; and creating a data structure in memory including the transport identifier, the business object identifier, and the second message.

It is to be understood that both the foregoing general description and the following detailed description are exemplary and explanatory only and are not restrictive of the invention, as described. Further features and/or variations may be provided in addition to those set forth herein. For example, the present invention may be directed to various combinations and subcombinations of the disclosed features and/or combinations and subcombinations of several further features disclosed below in the detailed description.

BRIEF DESCRIPTION OF THE DRAWINGS

The accompanying drawings, which are incorporated in and constitute a part of this specification, show certain aspects of the present invention and, together with the description, help explain some of the principles associated with the invention. In the drawings.

DETAILED DESCRIPTION

Reference will now be made in detail to the invention, examples of which are illustrated in the accompanying drawings. The implementations set forth in the following description do not represent all implementations consistent with the claimed invention. Instead, they are merely some examples consistent with certain aspects related to the invention. Wherever possible, the same reference numbers will be used throughout the drawings to refer to the same or like parts.

Systems and methods consistent with the invention manage data reflecting messages communicated within a computer system. As used herein, the term "message" broadly refers to any type of data communicated by a computer system. A message may, for example, be a character string, a document, a file, a program, or any other type of data. A message may also take any form, such as the extensible markup language (XML) format.

In one exemplary embodiment consistent with the invention, and as described in more detail below, a computing environment may implement a messaging protocol by which a message transport manager may obtain and retain messaging information about communicated messages. As part of this messaging protocol, the message transport manager may obtain messaging information from multiple phases within the system. The transport manager may then consolidate and correlate the obtained messaging information so that it reflects all sent messages and the business objects that generated or initiated the generation of each message. The message transport manager may also implement techniques to correlate each message with its associated business object(s).

Through the messaging protocol and message transport management techniques described in greater detail below, systems consistent with the invention may thus allow a computing system to effectively verify any communicated message. For example, systems and methods consistent with the invention may allow tracking of documents and/or messages sent within a collaborative computing environment and to associate those documents and/or messages with a particular business process.

Figure 1A:
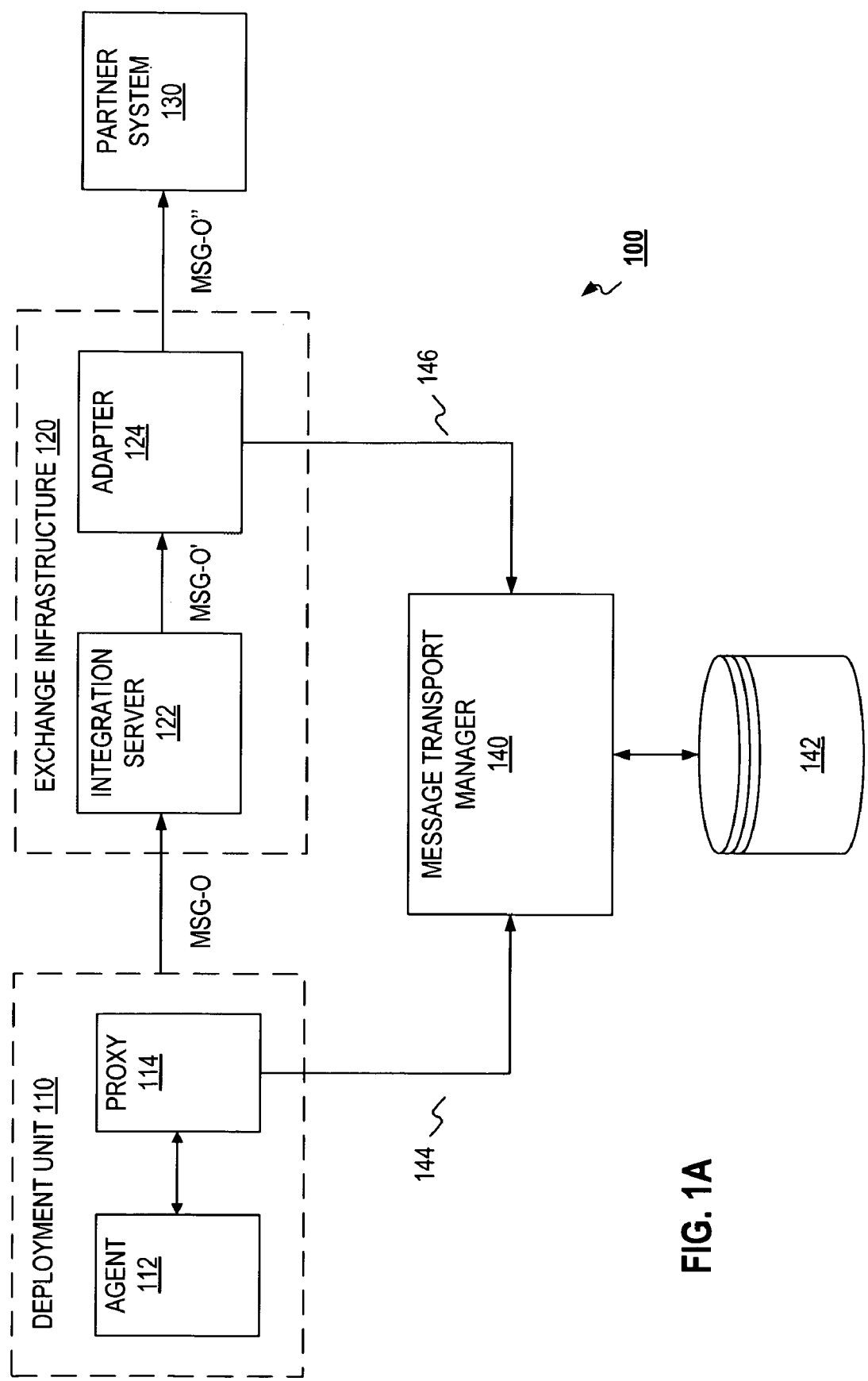
FIG. 1A is a pictorial diagram of an exemplary computing environment, consistent with the present invention, for illustrating an outbound message transport.
Figure 1B:
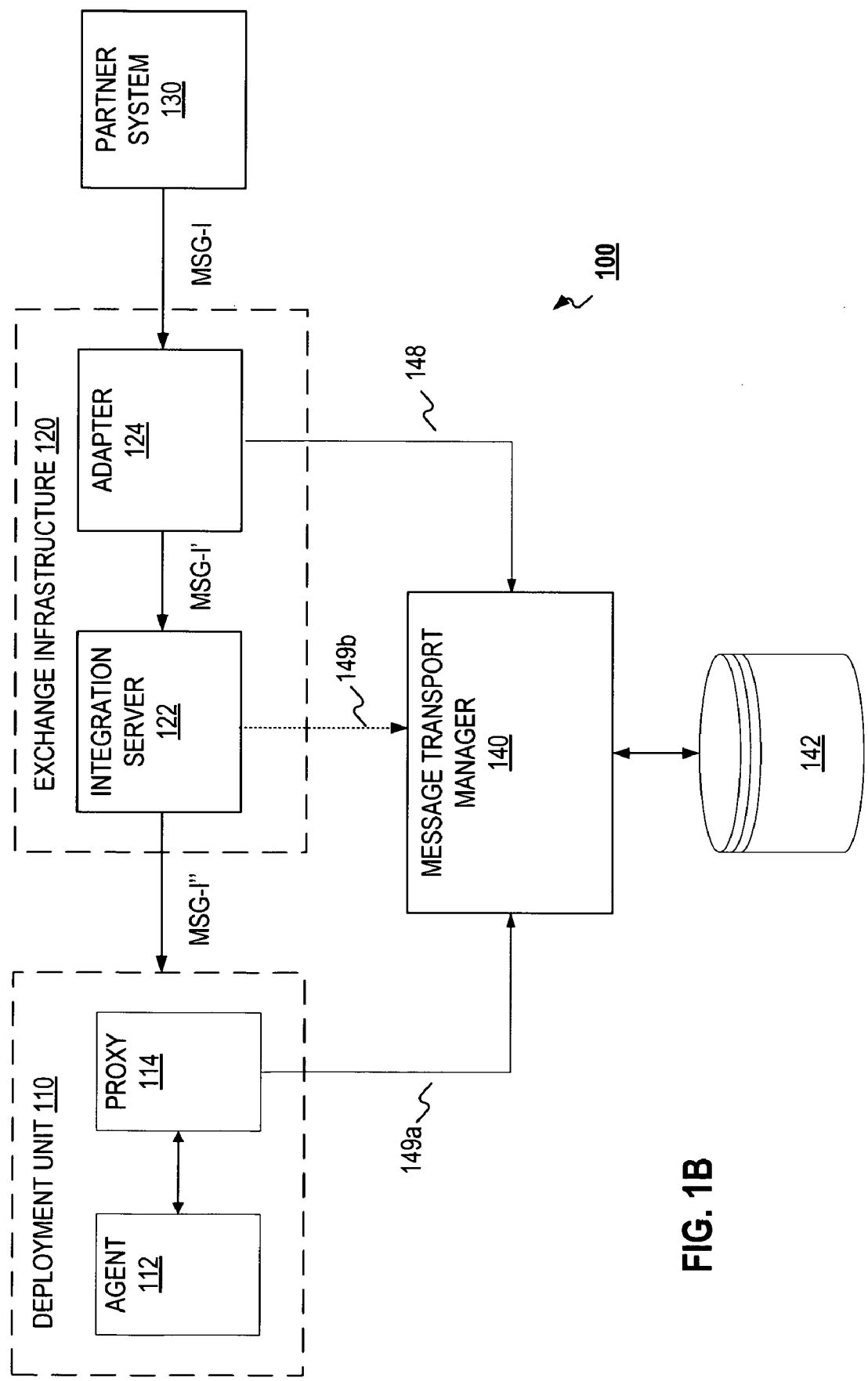
FIG. 1B is a pictorial diagram of an exemplary computing environment, consistent with the present invention, for illustrating an inbound message transport.

FIGS. 1A and 1B illustrate an exemplary system 100 for illustrating protocols for managing messages consistent with the present invention. As shown in FIGS. 1A and 1B, system 100 may include a deployment unit 110, an exchange infrastructure (XI) 120, and a partner system 130. FIG. 1A illustrates an exemplary outbound message transport (e.g., transport from deployment unit 110 to partner system 130). FIG. 1B, on the other hand, illustrates an exemplary inbound message transport (e.g., transport from partner system 130 to deployment unit 110). Further, while FIG. 1 shows only one of components 110, 120, and 130, systems consistent with the invention may include more than one of each component. For example, system 100 may include multiple deployment units 110 communicating with multiple partner systems 130 via XI 120.

Deployment unit 110, XI 120, and/or partner system 130 may communicate with one or more of the other components in system 100 via any appropriate type of data communication network (not shown). In one exemplary implementation, system 100 may use a private network. For example, deployment unit 110 may communicate with XI 120 via a private network. Such a private network may be any appropriate type of data communication network, such as a local area network or other private computer network. In exemplary embodiments, access to the private network may be limited by a firewall (not shown). System 100 may also use, alternatively or in addition, a public network such as the Internet. The Internet may refer to any publicly accessible network or networks interconnected via communication protocols, such as transmission control protocol/internet protocol (TCP/IP). For example, XI 120 may communicate with partner system 130 by using the Internet via a firewall.

Deployment unit 110 may correspond to a unit of a larger application system operated, for example, by a provider of services to the entity operating partner system 130. The application system associated with deployment unit 110 may thus communicate with partner system 130 via XI 120. Deployment unit 110 may include one or more business objects that process data. The term business object, when used in an SOA, represents a physical or logical object. For example, deployment unit 110 may be part of an SOA business application for managing inventory data. Deployment unit 110 may thus handle sales order data for the inventoried items and include a business object representing the sales order. As known in the art, deployment unit 110 may also generate messages based, for example, on the instantiation of a business object and/or the data within a business object instance.

In systems consistent with the invention, deployment unit 110 may thus further include an agent 112 and a proxy 114, as shown in FIG. 1A. Agent 112 may process the data of one or more business object instances. During an outbound transport, agent 112 may notify proxy 114 upon the instantiation of a particular business object instance. The notification may, for example, include business process data associated with the particular business object instance(s). Agent 112 may generate a message that it may then pass (e.g., through proxy 114) to XI 120. Proxy 114 may also create a message transport identification (ID) to be associated with the generated message. During an inbound transport, agent 112 may initiate the execution of a business process requested in a message received from XI 120 via proxy 114. To execute the requested business process, agent 112 may create or update one or more business object instances.

XI 120 provides a standardized interface for the exchange of information between different computer systems over network connection. XI 120 may thus support the technical interaction of business processes of system 100, such as the business processes of deployment unit 110 and partner system 130. As shown in FIGS. 1A and 1B, XI 120 may further include an integration server 122 and an adapter 124. In one exemplary embodiment, XI 120 may be implemented using the exchange infrastructure commercially available from by SAP AG, Walldorf, Germany.

Integration server 122 may route and process messages communicated between deployment unit 110 and partner system 130. To this end, integration server 122 may offer a runtime infrastructure for managing business processes and message flow, and also for transforming message contents between sender and receiver systems. Adapter 124 may provide a customized interface between integration server 122 and the application interface of partner system 130. During an inbound transport, adapter 124 may also create the message transport ID associated with the transported message.

Further, as noted above, when XI 120 routes and processes messages sent between deployment unit 110 and partner system 130, XI 120 may modify the messages. FIG. 1A, for instance, shows that during an outbound transport, integration server 122 may generate a new message MSG-O' that differs from the initial message MSG-O sent by deployment unit 110. Integration server 122 may generate such new messages when, for example, sending duplicate messages to different recipients or when performing mapping functions, as known in the art. For instance, integration server 122 may split a message (or a "parent" message) into multiple messages (or "child" messages). Moreover, as illustrated in FIG. 1A, adapter 124 may also send a message MSG-O" that further differs from message MSG-O' output by integration server 122. FIG. 1B illustrates the reverse process for an inbound transport. In particular, FIG. 1B shows that deployment unit 110 may receive a message MSG-I" from integration server 122, which may differ from message MSG-I' output by adapter 124, which may differ from the initial message MSG-I sent by partner system 130. Again, the differences between messages may result from splitting messages into "child" messages or other route processes.

Message transport manager 140 may obtain and retain information from one or more phases of the message transport process. For instance, as shown in FIG. 1A illustrating the outbound transport, message transport manager 140 may receive information 144 from proxy 114 and receive information 146 from adapter 124. Information 144 may include a transport ID and an ID of any business objects associated with the initial message MSG-O sent by deployment unit 110. Messaging protocols consistent with the invention may thus require providing information identifying the initial message MSG-O and its associated business objects. Information 146, on the other hand, may include the actual message MSG-O" sent by XI 120 to partner system 130. To correlate MSG-O" with the initial message MSG-O, information 146 may also include the transport ID or some other data allowing manager 140 to correlate information 144 to information 146. Messaging protocols consistent with the invention may thus also require providing information identifying the actual message MSG-O" sent to a partner system 130.

FIG. 1B, which illustrates the inbound transport, shows that message transport manager 140 may receive information 148 from adapter 124. Information 148 may include the initial message MSG-I sent by partner system 130, as well as a transport ID for the particular message. Messaging inbound protocols consistent with the invention may thus require providing information identifying the initial message MSG-I sent by or received from a partner system 130. Information 149a, on the other hand, may include information identifying the business object(s) that agent 112 processed instantiations of based on the inbound message. Information 149a may also include the parent/child relationships of messages generated by XI 120 during the transport process. Alternatively, integration server 122 may provide the parent/child relationships to message transport manager 140 as part of information 149b. In either case, information 149a and 149b may include the transport ID associated with the transported message. Messaging inbound protocols consistent with the invention may thus require providing information identifying the business objects processed by system 100 as a result of the initial message MSG-I sent by partner system 130, as well as the relationships the initially received message has to other messages that XI 120 may have been generated as part of the inbound transport.

Message transport manager 140 may be implemented by any type of processing or computing component configured to perform the operations above and described below. Further, as shown in FIGS. 1A and 1B, message transport manager 140 may communicate with a database 142, which may be any type of memory structure for storing the messaging information described in greater detail below with respect to FIG. 3.

Figure 2A:
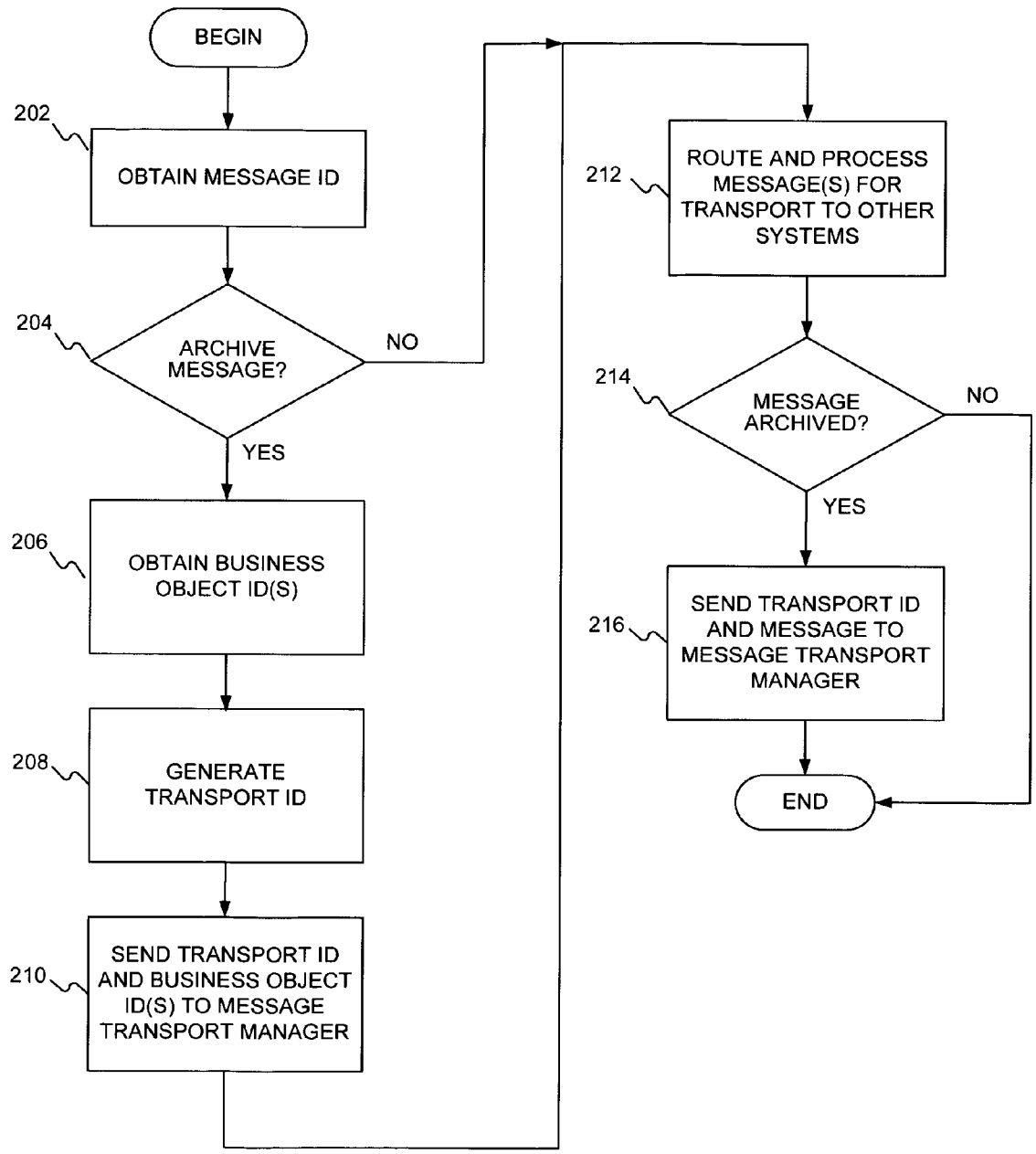
FIG. 2A illustrates an exemplary outbound message transport process consistent with the present invention.

FIG. 2A is a flow diagram that further illustrates an exemplary outbound transport process consistent with the invention and as generally described above with respect to FIG. 1A. As shown in FIG. 2A, the process may begin when a deployment unit 110 obtains or receives a message ID (stage 202). For example, when deployment unit 110 instantiates a business object instance, agent 112 may notify proxy 114 of the instantiation. Agent 112 may also generate a message for sending, via proxy 114, to XI 120 along with a message ID. Agent 112 may then receive the message ID as part of stage 202.

Deployment unit 110 may then determine whether to archive the generated message indicated by the message ID (stage 204). In one exemplary implementation, agent 112 may determine to archive a particular message based on predefined criteria set by deployment unit 110. For example, deployment unit 110 may define that all messages sent to partner system 130 are to be archived or, alternatively, that only certain messages (e.g., messages associated with certain business objects) are to be archived.

If the message is not to be archived (stage 204, "No"), then processing proceeds to processing stage 212 below. Otherwise, if the message is to be archived (stage 204, "Yes"), then agent 112 may obtain from proxy 114 the business object ID(s) associated with the message (stage 206). Further, in exemplary implementations, agent 112 may obtain more than one business object ID. For example, a message generated by deployment unit 110 may be associated with more than one business object. In such implementations, agent 112 may obtain a business object ID for each business object associated with the generated message.

Deployment unit 110 may then generate a transport ID (stage 208). In one exemplary embodiment, deployment unit 110 may use the obtained message ID as the transport ID. Alternative embodiments, however, may use any type of ID value (e.g., a random number) that may uniquely identify the message.

Deployment unit 110 may then send the transport ID and business object ID(s) to message transport manager 140 (stage 210). For example, agent 112 may send a list of business object IDs labeled with the transport ID as part of information 144. Message transport manager 140 may then store the received information in database 142. In one implementation, database 142 may store the one or more business object ID(s) indexed by the transport ID in database 142. Exemplary data structures by which database 142 may store the messaging data are described in greater detail below with respect to FIG. 3.

Integration server 122 may then receive the message and route it to partner system 130 (stage 212). To this end, proxy 114 may first send the message and the transport ID to integration server 122 of XI 120. Proxy 114 may also provide integration server 114 with an indication of the result of the determination made in stage 204; that is, whether the message is to be archived. In exemplary embodiments, the transported message may thus include a flag that, when set to "true," indicates that the message is to be archived. Once integration server 122 receives the message, it may then split, duplicate, and/or modify the message into multiple messages as part of routing the message to partner system 130. For example, as known in the art, integration server 122 may need to split the message into multiple messages if it needs to route the message to multiple adapters 124 associated with multiple partner systems. As described above, FIG. 1A illustrates how the message may change during the routing process.

Integration server 122 may then pass one or more messages (associated with the initial message(s) generated by deployment unit 110) to adapter 124. Upon receiving the message(s), adapter 124 may determine whether it should archive the message (stage 214). Adapter 124 may make this determination based on the flag that may be included in the message transport that indicates whether to archive the message. In addition, adapter 124 may also determine whether to archive the message based on a determination that the message is to be sent outside the corporate border—e.g., to a different computer system of partner system 130 belonging to a different business entity. Adapter 124 may make this determination based, for example, on the configurations of XI 120 indicating whether the destination is outside the corporate border.

Based on the above, if adapter 124 thus determines that the message is to be archived (stage 214, "Yes"), then adapter 124 may send the message and the transport ID to message transport manager 140 (stage 216), e.g., as shown by information 146 of FIG. 1A. If the message is not to be archived (stage 214, "No"), then the message is routed to partner system 130 and the process ends.

If the message is to be archived, then message transport manager 140, upon receiving information 146, may determine whether an entry in database already exists for the message. If an entry exists, then manager 140 may add the message received from adapter 124 to the entry. Otherwise, manager 140 may then make a new entry for the message. In either case, message transport manager 140 may obtain from adapter 124 and retain in database 142 a complete and accurate copy of the message sent to partner system 130 by adapter 124. For instance, if message MSG-O" includes a digital signature, then database 142 will also retain a digitally signed version of the message. Alternative embodiments consistent with the invention may, however, retain versions of the messages that are different from the version actually sent to partner system 130.

Figure 2B:
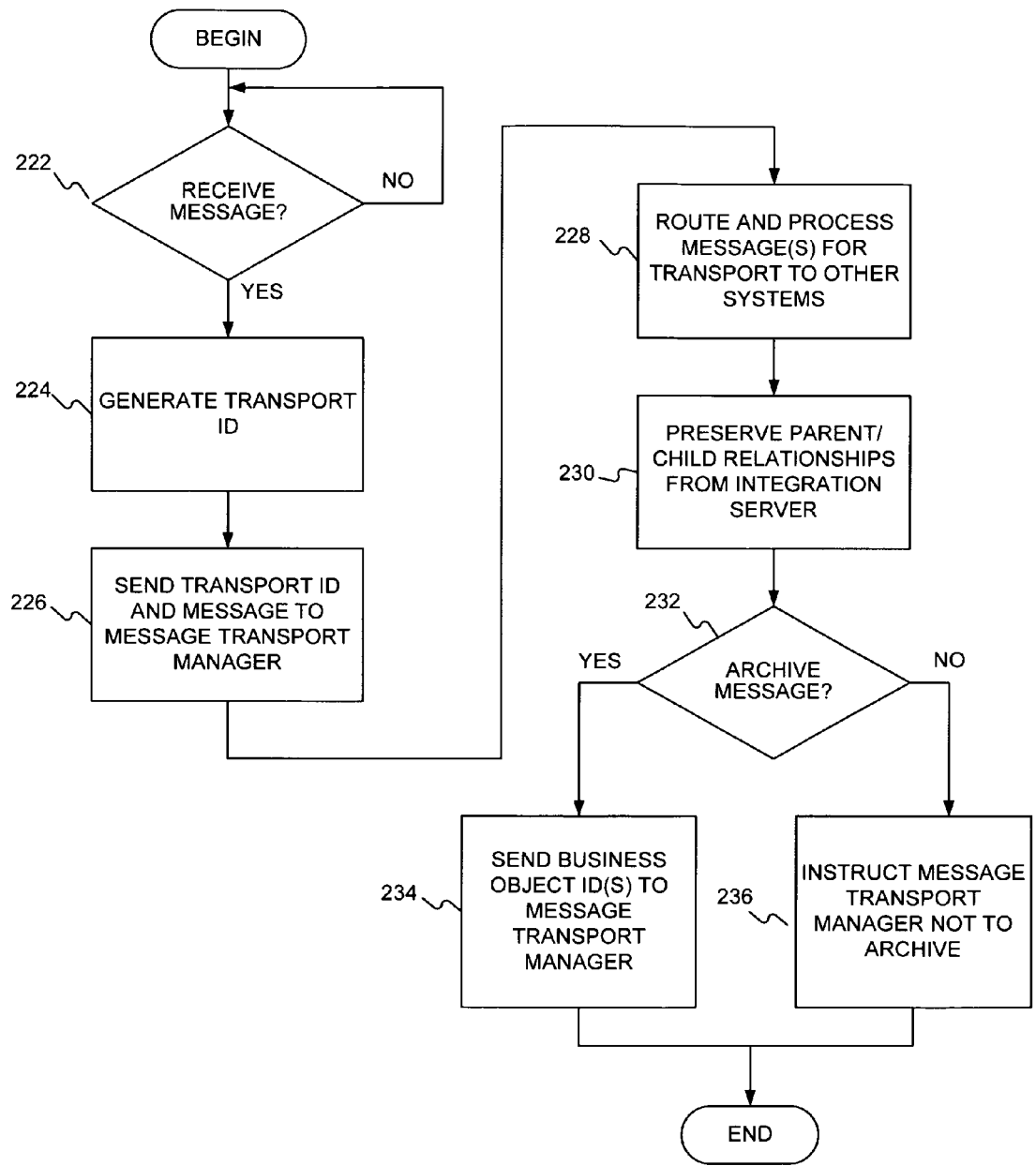
FIG. 2B illustrates an exemplary inbound message transport process consistent with the present invention.

FIG. 2B is a flow diagram that further illustrates an exemplary inbound transport process consistent with the invention and as generally described above with respect to FIG. 1B. As shown in FIG. 2B, the process may begin when adapter 124 receives a message from partner system 130 (stage 222). In one implementation, adapter 124 may also confirm that the received message is from outside the corporate border. Adapter 124 may make this determination based, for example, on the configurations of XI 120 indicating whether the message source is outside the corporate border.

Based on the above, if adapter 124 thus determines that the message is to be archived (stage 222, "Yes"), then adapter 124 may generate a transport ID for the message (stage 224). In an exemplary implementation, adapter 124 may generate a Universally Unique Identifier (UUID) to use as the transport ID. Adapter 124 may then send the message and the transport ID to message transport manager 140 (stage 226), e.g., as shown by information 148 of FIG. 1B. Because adapter 124 may modify the message received from partner system 130, adapter 124 may send to manager 140 the actual version of the message received from partner system 130. Message transport manager 140 may then store the received information in database 142. In one implementation, database 142 may store the message indexed by the transport ID in database 142. Exemplary data structures by which database 142 may store the messaging data are described in greater detail below with respect to FIG. 3.

Integration server 122 may then receive the message and transport ID for routing to one or more deployment units 110 (stage 228). As described above, once integration server 122 receives the message, it may then split, duplicate, and/or modify the message into multiple messages as part of routing the message to the deployment units 110. For example, as known in the art, integration server 122 may need to split the message into multiple messages if it needs to route the message to multiple deployment units 110 with business objects that may need to process the message data. As noted above, the routing and processing of integration server 122 may thus create "child" messages based on received "parent" messages. FIG. 1B further illustrates how the message may change during the routing process from partner system 130 to deployment unit 110.

Integration server 122 may thus preserve the parent/child relationships of the routed and processed messages (stage 230). For instance, integration server 122 may generate an ID for the parent message that would be appended to each child message. The child message would thus preserve the identity of its parent. In one embodiment, systems consistent with the invention may then send the parent/child relationship information to message transport manager 140, as indicated by information 149-*b* shown in FIG. 1B. The information 149-*b* may also include the transport ID for the corresponding message received from adapter 124. Message transport manager 140 could thus index the parent/child relationship information with the transport ID for the corresponding message in database 142. In alternative embodiments, however, integration server 122 may not send the parent/child relationship information to manager 140, but, instead, send that information to the destination deployment unit(s) 110. As described in more detail below with respect to processing stage 234, deployment unit 110 may then the parent/child relationship information to manager 140 along with any business object ID(s).

In either case, integration server 122 may then route the message (e.g., the child messages MSG-I") to deployment unit 110. Agent 112 may then initiate the execution of a business process requested in the message received from XI 120 via proxy 114. Agent 112 may create or update one or more business object instances to execute the requested business process. Further, upon receiving the message, deployment unit 110 may determine whether to archive the message (stage 232). In one exemplary implementation, deployment unit 110 may determine to archive a particular message based on predefined criteria. For example, deployment unit 110 may define that all received messages are to be archived or that only certain messages (e.g., messages associated with certain business objects or associated with certain partner systems 130) are to be archived.

If deployment unit 110 thus determines that the message is to be archived (stage 232, "Yes"), then deployment unit may send the transport ID and a list of the business object IDs associated with the message to message transport manager 140 (stage 234). The information sent to manager 140 is generally illustrated as information 149-a in FIG. 1B. Further, as noted above, information 149-a may include the parent/child relationship information the was preserved by and received from integration server 122. Message transport manager 140 may then store the received information in database 142. In one implementation, database 142 may store the business object ID(s) indexed by the transport ID in database 142. Exemplary data structures by which database 142 may store the messaging data are described in greater detail below with respect to FIG. 3.

If deployment unit 110 determines that the message is not to be archived (stage 232, "No"), then deployment unit may instruct message transport manager 140 that the message will not be archived (stage 236). In response, manager 140 may then remove the entry in database 142 made for the corresponding message as part of processing stage 226. Alternative embodiments may, however, retain the entry even though deployment unit 110 determines not to archive the message.

Figure 3:
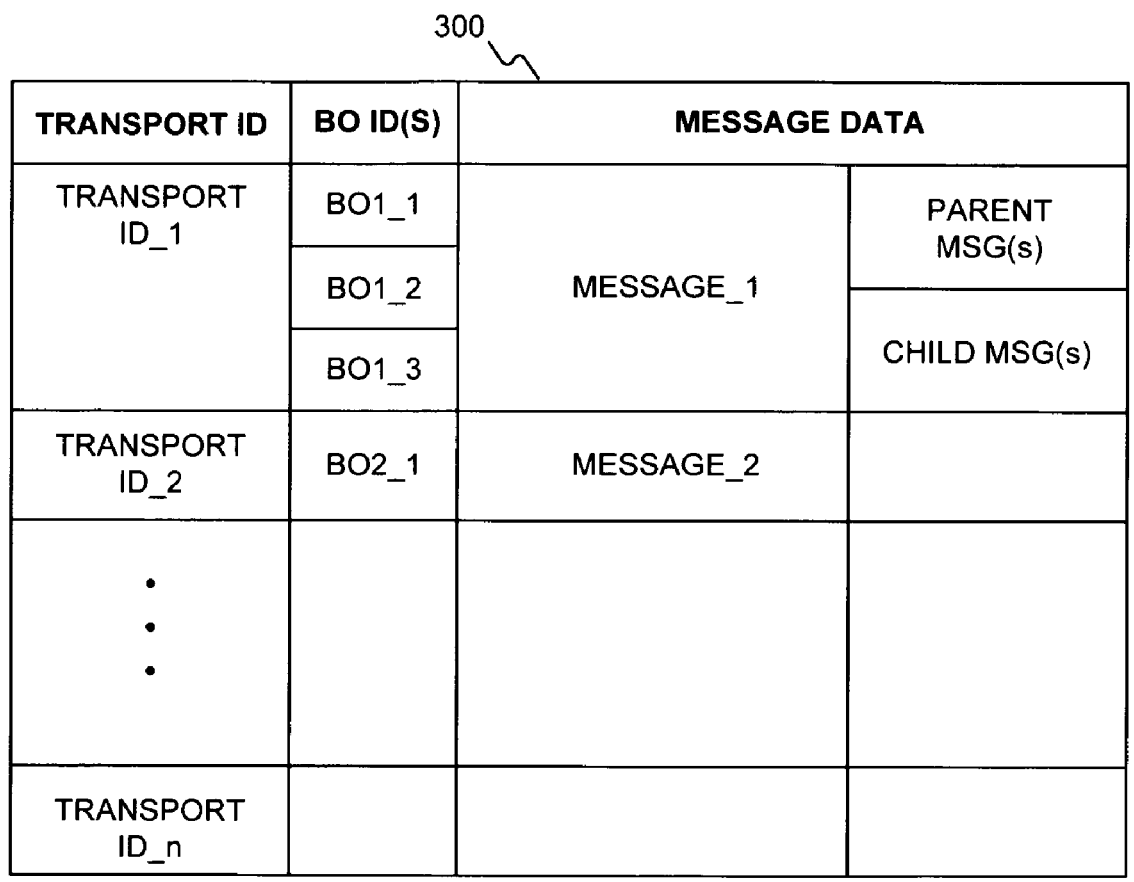
FIG. 3 illustrates an exemplary database structure used by a message transport manager consistent with the invention for managing messaging information.

FIG. 3 illustrates an exemplary database structure for the database 142 associated with message transport manager 140. As shown in FIG. 3, database 142 may include a data structure 300 for retaining the messaging information obtained by the protocols described above with respect to FIGS. 2A and 2B. The exemplary embodiment in FIG. 3 includes n message entries, corresponding to respective transport IDs of "Transport ID_1", "Transport ID_2" . . . "Transport ID_n". As described above, the transport IDs may be used to index or correlate the various information retained by database 142. For instance, database 142 may correlate to each respective transport ID, the corresponding business object ID(s) and the corresponding message data. Further, as shown in FIG. 3, the message data may further include the preserved information on the parents/child relationships associated with the new messages generated during the route processing of XI 120.

As described above, systems and methods consistent with the invention may manage the transport of messages in a distributed computing environment. For purposes of explanation only, certain aspects and embodiments are described herein with reference to the components illustrated in FIGS. 1-3. The functionality of the illustrated components may overlap, however, and may be present in a fewer or greater number of elements and components. Further, all or part of the functionality of the illustrated elements may co-exist or be distributed among several geographically dispersed locations. Moreover, embodiments, features, aspects and principles of the present invention may be implemented in various environments and are not limited to the illustrated environments. For example, while the above description may refer to a message or business object in the singular, one skilled in the art will understand that the description applies equally to plural messages or business objects. Similarly, the above description referring to plural messages or business objects applies equally to a message or business object in the singular.

Further, the sequences of events described in FIGS. 1-3 are exemplary and not intended to be limiting. Thus, other process stages may be used, and even with the processes depicted in FIGS. 1-3, the particular order of events may vary without departing from the scope of the present invention. Moreover, certain process stages may not be present and additional stages may be implemented in FIGS. 1-3. Also, the processes described herein are not inherently related to any particular system or apparatus and may be implemented by any suitable combination of components.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for managing messages transported between a first computer system and a second computer system, the method comprising:
    obtaining, by the first computer system, a business object identifier that identifies a business object associated with a first message to be transported between the first computer system and the second computer system, wherein obtaining the business object identifier further includes sending the business object identifier to a message transport manager that retains information on a plurality of messages communicated between the first computer system and the second computer system;
    obtaining, by a third computer system, a copy of the first message from the first computer system;
    creating, by the third computer system, a data structure that includes the business object identifier and the copy;
    sending, by the first computer system, the first message to the second computer system;
    creating, by the second computer system, a second message based on the first message;
    obtaining, by the third computer system, the second message from the second computer system; and
    adding, by the third computer system, the second message to the data structure.

2. The method of claim 1, wherein creating the data structure further includes:
    determining whether to create the data structure based on an identifier associated with the first message.

3. The method of claim 2, wherein determining whether to create the data structure further includes:
    determining whether to create the data structure based on the business object associated with the first message.

4. The method of claim 1, further comprising:
    creating a transport identification to be associated with the first message.

5. The method of claim 4, wherein the transport identification corresponds to an identification assigned to the first message.

6. The method of claim 5, wherein the data structure includes the transport identification.

7. The method of claim 1, further comprising:
    retaining a relationship between the first message and the second message; and
    storing the retained relationship in the data structure.

8. a method for managing messages transported between a first computer system and a second computer system, the method comprising:
    obtaining, by the first computer system, a business object identifier that identifies a business object associated with a first message to be transported over a network from the first computer system to the second computer system, wherein obtaining the business object identifier further includes sending the business object identifier to a message transport manager that retains information on a plurality of messages communicated between the first computer system and the second computer system;
    obtaining, by the third computer system, a copy of the first message from the first computer system;
    creating, by the third computer system, a data structure that includes the business object identifier and the copy;
    generating a transport identifier associated with the first message;
    routing the first message to the second computer system, wherein the routing generates a second message that is transported to the second computer system;
    obtaining, by the third computer system, the second message from the second computer system; and
    adding, by the third computer system, the transport identifier, the business object identifier, and the second message to the data structure.

9. a computer system for managing messages transported between a first computer system and a second computer system, comprising:
    means for obtaining, by the first computer system, a business object identifier that identifies a business object associated with a first message to be transported between the first computer system and the second computer system, wherein the means for obtaining the business object identifier further includes a means for sending the business object identifier to a message transport manager that retains information on a plurality of messages communicated between the first computer system and the second computer system;
    means for obtaining, by a third computer system, a copy of the message from the first computer system;
    means for creating, by the third computer system, a data structure that includes the business object identifier and the copy;
    means for sending, by the first computer system, the first message to the second computer system;
    means for creating, by the second computer system, a second message based on the first message;
    means for obtaining, by the third computer system, the second message from the second computer system; and
    means for adding, by the third computer system, the second message to the data structure.

10. The system of claim 9, wherein the means for creating the data structure further includes:
    means for determining whether to create the data structure based on an identifier associated with the first message.

11. The system of claim 10, wherein the means for determining whether to create the data structure further includes:

means for determining whether to create the data structure based on the business object associated with the first message.

12. The system of claim 9, further comprising:
means for creating a transport identification to be associated with the first message.

13. The system of claim 12, wherein the transport identification corresponds to an identification assigned to the message, and wherein the data structure includes the transport identification.

14. The system of claim 9, further comprising:
means for retaining a relationship between the first message and the second message; and
means for storing the retained relationship in the data structure.

* * * * *